S. BURROWS.
Seed-Dropper.
No. 25,382.  Patented Sept. 13, 1859.
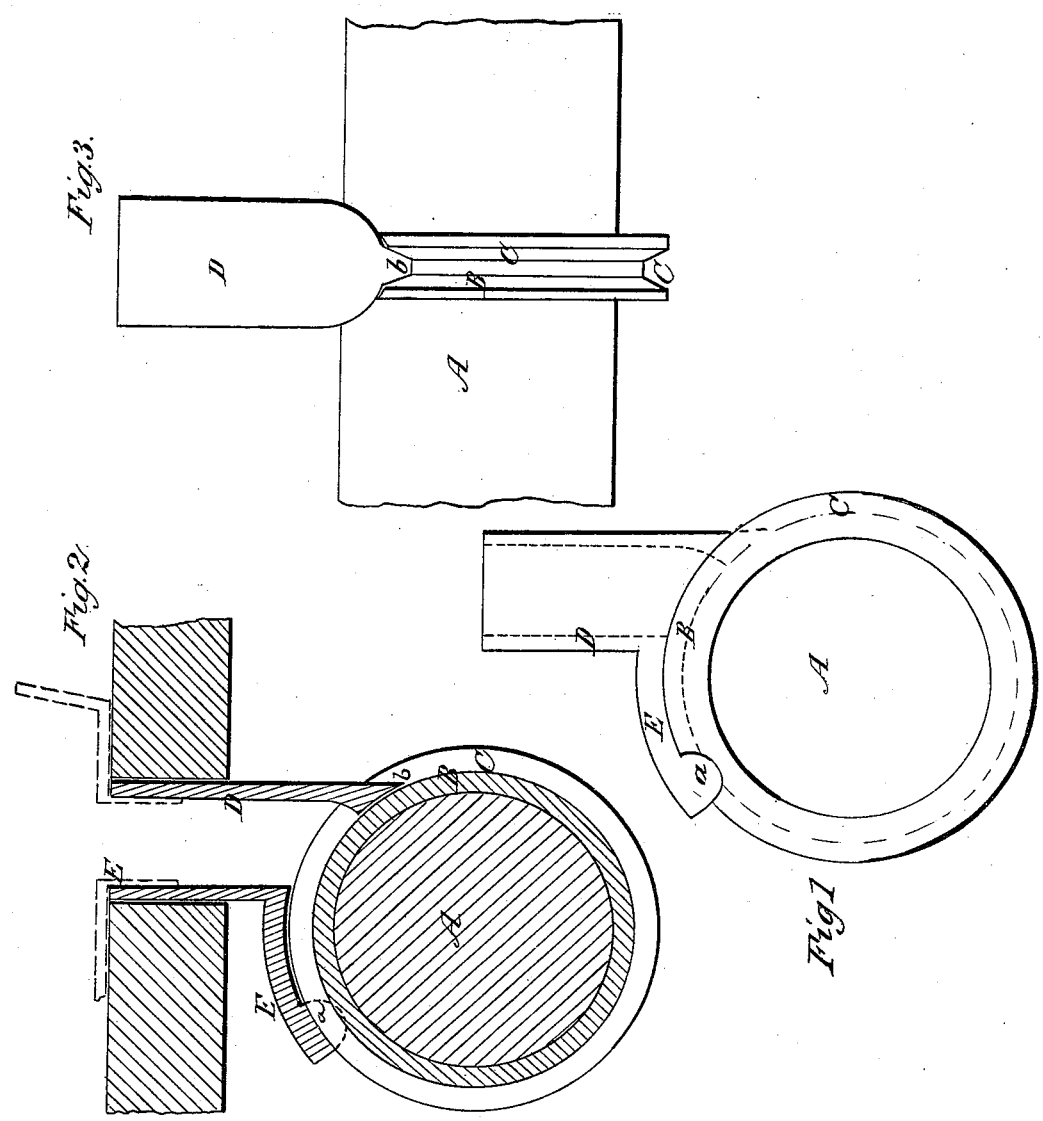

UNITED STATES PATENT OFFICE.

STEPHEN BURROWS, OF LIMA, WISCONSIN.

IMPROVEMENT IN SEED-DRILLS.

Specification forming part of Letters Patent No. 25,382, dated September 13, 1859.

*To all whom it may concern:*

Be it known that I, STEPHEN BURROWS, of Lima, in the county of Rock and State of Wisconsin, have invented a new and useful Improvement in Seed-Drill Distributers; and I do hereby declare that the following is a full, clear, and exact description of the same, reference being had to the accompanying drawings, forming a part of this specification, in which—

Figure 1 is a side view, Fig. 2 a vertical section, and Fig. 3 an end view, of a seed-distributer constructed after my invention.

Similar letters of reference in each of the several figures indicate corresponding parts.

The nature of my invention consists in the employment of a grooved ring fitted on the axle or shaft of a seed-drill, in combination with a peculiarly-constructed tube leading from the hopper into the groove of the ring, substantially in the manner and for the purpose hereinafter described.

To enable others skilled in the art to make and use my invention, I will proceed to describe its construction and operation.

A represents the shaft of a seed-drill, and B C the grooved ring fitted on said shaft, the groove C extending entirely round the periphery of the ring.

D is a tube leading down from a suitable hopper into the groove of the ring, as shown. This ring has a curved guard, E, which partly covers the top of the ring, ears *a a* being provided on said guard to hold it in place on the ring and prevent lateral play. A tongue, *b*, is formed on the bottom of the tube at the rear, said tongue corresponding in form with the groove of the ring and fitting snugly down in said groove at a point slightly in rear of the axis of the ring, as shown.

In the drawings the red lines F show a tube which I propose to use for conducting the seed directly from the hopper to the tube D. This tube may not be necessary in practice, only in some particular character of drills.

From the above description it will be seen that the ring revolves independently of the conducting-tube, owing to said tube resting loosely on the ring. It will also be seen that the hood or guard E of the ring prevents the seed falling forward, but compels it to pass down in the groove to the drill-tooth. It will likewise be seen that the tongue of the tube D prevents the seed falling back and discharging behind the drill-tooth. Said tongue also acts as a stop against the distribution of seed when the ring is revolved backward.

In using my invention on a drill I provide for each tooth a ring, B C, and tube D E, and to give motion to the shaft I arrange cone-pulleys or cone cog-gearing on said shaft and have the same combined with the shaft of the carriage-wheels, said shaft having similar cone gearing or pulleys arranged on it. When pulleys are used belts of course are necessary to connect the pulleys of the distributing-shaft with the carriage-wheel shaft. The rapidity of discharging the seed depends upon the velocity of the rings, and therefore I propose to use cone-gearing, so that by changing the belt from a small pulley on the ring-shaft to a large one on a carriage-wheel shaft, or vice versa, the distribution of the seed will be regulated as desired. The same effect will be produced by shifting with a clutch the cone cog-gearing, so as to have a small wheel of the carriage-wheel shaft gear with a large wheel of the ring-shaft, or vice versa.

By my invention the seed is distributed easily and evenly and the difficulties of clogging, uncertainty of operating, wearing out of brushes, wood, or rubber wholly avoided, and conveniences afforded for applying it to any seed-drill.

What I claim as my invention, and desire to secure by Letters Patent, is—

The employment of a grooved ring, B C, fitted on the axle or shaft of a seed-drill, in combination with the peculiarly-constructed tube D E, leading from the hopper into the groove of the ring, substantially as and for the purposes set forth.

STEPHEN BURROWS.

In presence of—
   N. H. WOOD,
   C. W. WILLIAMS.